(12) United States Patent
Jang et al.

(10) Patent No.: US 6,998,450 B1
(45) Date of Patent: Feb. 14, 2006

(54) METHOD FOR PREPARING A HOMO-AND CO-POLYMERS BY POLYMERIZATION OF CYCLIC OLEFIN COMPOUNDS USING FLUORINE-CONTAINING AROMATIC HYDROCARBON COMPOUND AS CATALYST ACTIVATOR

(75) Inventors: Young Chan Jang, Daejeon (KR); Hyun Kyung Sung, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 11/032,821

(22) Filed: Jan. 11, 2005

(30) Foreign Application Priority Data

Sep. 16, 2004 (KR) ............... 10-2004-0074088

(51) Int. Cl.
*C08F 4/80* (2006.01)
*C08F 32/04* (2006.01)
(52) U.S. Cl. ............... 526/144; 526/169.1; 526/281
(58) Field of Classification Search ............... 526/144, 526/169.1, 281
See application file for complete search history.

(56) References Cited

U.S. PATENT DOCUMENTS 3,814,744 A * 6/1974 Yagi et al. ............... 526/138
4,100,338 A * 7/1978 Suld et al. ............... 526/142
5,332,794 A * 7/1994 Ohtsu et al. ............. 526/169.1

FOREIGN PATENT DOCUMENTS

| EP | 0504418 A1 | 9/1992 |
|----|------------|--------|
| JP | 61-221206  | 10/1986 |
| JP | 61-271308  | 12/1986 |
| JP | 62-252406  | 11/1987 |
| JP | 64-000106  | 1/1989 |
| JP | 64-066216  | 3/1989 |

\* cited by examiner

*Primary Examiner*—Fred Teskin
(74) *Attorney, Agent, or Firm*—Davidson, Davidson & Kappel, LLC

(57) ABSTRACT

The present invention provides a method for preparing homo- and co-polymers by polymerizing cyclic olefin compounds using addition polymerization. The method can produce a cyclic olefin polymer having a high molecular weight with a high yield in the presence of, as an addition polymerization catalyst, a complex prepared by mixing a nickel salt compound and an organoaluminoxane compound with at least one fluorine-containing aromatic hydrocarbon compound represented by the following formula 1 or 2 as a catalyst activator:

$$C_6R_mH_{6-m} \quad \text{Formula 1}$$

where R is $CF_3$; and m is from 1 to 3, or $$C_6F_nH_{6-n} \quad \text{Formula 2}$$

where n is from 1 to 6.

11 Claims, No Drawings

METHOD FOR PREPARING A HOMO-AND CO-POLYMERS BY POLYMERIZATION OF CYCLIC OLEFIN COMPOUNDS USING FLUORINE-CONTAINING AROMATIC HYDROCARBON COMPOUND AS CATALYST ACTIVATOR

BACKGROUND OF THE INVENTION

1. The Field of the Invention

This invention relates to a method for preparing homo- and co-polymers of cyclic olefin compounds using addition polymerization. More particularly, this invention relates to a method for preparing cyclic olefin polymers having high molecular weights with high yields in the presence of, as a catalyst, a complex prepared by mixing a nickel salt compound and an organoaluminoxane compound, and a fluorine-containing aromatic hydrocarbon compound as a catalyst activator having a high solubility in a non-polar solvent and forming a homogeneous catalyst system, in preparing homo- and co-polymers by polymerization of cyclic olefin compounds.

2. Related Prior Art

The copolymers of ethylene/propylene and cyclic olefin are endowed with excellent properties such as transparency, heat resistance, etc., which hardly appear in the existing polymers such as polyethylene or polypropylene, with the introduction of a rigid ring structure such as norbornene into the main chain of the polymer. Accordingly, the cyclic olefin homopolymer/copolymer are expected to substitute for polycarbonate (PC) or polymethylmethacrylate (PMMA) resins currently used as an information recording material, and possibly utilized as an optical material with transparency and low moisture absorption for various applications such as DVD, CD, lens, optical fiber, and the like. The main advantages of the cyclic olefin polymers are low density, high transparency, low moisture absorption, and high heat resistance.

Currently, various norbornene derivatives having different alkyl groups and polar functional groups are used for the preparation of cyclic olefin polymers. Such norbornene derivatives are useful for the preparation of homopolymers as well as copolymers using ethylene or propylene.

Some advanced manufacturers of cyclic olefin polymers have recently been developing novel materials for next-generation having epoch-making thermal, mechanical and optical properties unattainable by the existing polyolefins through copolymerization of styrene, cyclic olefin, methylmethacrylate, or the like. In particular, the polymers prepared by copolymerization of cyclic olefin and ethylene are standing in the spotlight as a next-generation information recording material such as CD, DVD, and forth due to their remarkably excellent optical and thermal properties.

The norbornene polymers not only substitute for polycarbonate used for the aforementioned applications but also reduce the space between CD tracks to allow high integration, so they are applicable to next-generation DVD (e.g., HD-DVD), or the like. In addition, such norbornene polymers are widely used for more various applications such as lens of camcorders or automobile cameras due to their excellent properties such as optical properties, dimensional stability, excess moisture tolerance, low density, and so forth.

The polymerization catalysts for preparation of a polymer using a cyclic olefin compound are classified into an addition polymerization catalyst, a ROMP (Ring Opening Metathesis Polymerization) catalyst, and a cationic catalyst, including a radical initiator.

Among these, the addition polymerization catalyst, the ROMP catalyst and the cationic catalyst have a common characteristic that they can be used for preparation of cyclic olefin polymers with high transparency. The use of the ROMP catalyst necessarily demands a step of saturating the double bonds of the polymer after polymerization, and the addition polymerization catalyst is used for preparation of a cyclic olefin polymer having a low dielectric property (i.e., insulating property).

The representative metals constituting the addition polymerization catalyst include Ti, Zr, Cr, Co, Ni, Pd, and the like. Among these metals, Ni and Pd are representative metals for preparation of a cyclic olefin polymer.

The representative main metals constituting the ROMP catalyst include Mo, W, Ru, Re, or the like. The activity of the catalyst can be controlled through a modification of the ligands around the metal or a change in the additives.

As an example of the conventional methods using a transition metal as a polymerization catalyst in the preparation of a homopolymer or a copolymer from norbornene or its derivative, U.S. Pat. No. 3,330,815 discloses a method for addition polymerization of norbornene using a complex prepared from $TiCl_3$ (or $TiCl_4$) and an organoaluminum compound, or $Pd(C_6H_5CN)_2Cl_2$ as a catalyst. Disadvantageously, this method provides a polymer having a number average molecular weight (Mn) of less than 10,000 with a low yield.

Another example is a method for addition polymerization of norbornene and its derivatives using a complex prepared from a bidentate ligand, Ni(0) salt, and $B(C_6F_5)_3$ as disclosed in U.S. Pat. Nos. 6,350,837B1 and 6,538,085B2. In this case, however, one of the components of the catalyst, $B(C_6F_5)_3$, is a very expensive compound, so the method is limited in its industrial uses.

U.S. Pat. No. 5,705,503 discloses a method for addition polymerization of a norbornene derivative using a Zwitterion complex prepared from palladium as a catalyst. However, this method requires an excess of the catalyst with respect to the amount of the monomer (the ratio of monomer to catalyst is less than 250) and a polymerization time of 12 hours or more for a relatively high yield.

A similar method is disclosed in U.S. Pat. Nos. 6,262,194B1 and 6,265,506B1, which relates to a method for addition polymerization of norbornene using a Zwitterion complex prepared from palladium metal. This method is also disadvantageous in that the complex should be prepared by coordination of ligands of a specific structure with palladium metal, which makes it difficult to apply the method to industrial large-scaled production of the polymer.

On the other hand, European Patent Application No. 0 504 418A1 (filed on Sep. 23, 1992) discloses a method for addition polymerization of a cyclic olefin compound in the presence of A) a transition metal salt compound, B) a compound capable of forming an ionic complex with the compound A), and C) an organoaluminum compound.

Other examples of the cyclic olefin polymerization method using a transition metal as a catalyst include a cyclic olefin polymerization method using a Zirconocene compound and an aluminoxane compound (Japanese Patent Application Laid-open Kokai No. Sho 64-66216), and a method for copolymerization of norbornene and an olefin compound using a transition metal salt compound and an aluminoxane compound (Japanese Patent Laid-open Nos. 61-221206 and 64-106). However, these methods need an excess of the aluminoxane compound, causing discoloration of the product, and necessarily a step of removing a catalyst residual in the polymer after the polymerization reaction to reduce productivity.

Japanese Patent Laid Open Nos. 61-271308 and 62-252406 disclose methods for copolymerization of norbornene and olefin using a catalyst system comprising a vanadium compound and an organoaluminum compound, which methods involve an extremely low catalyst activity.

There are many examples of the method for addition polymerization of a cyclic olefin compound using a metallocene catalyst. For example, U.S. Pat. Nos. 5,087,677 and 5,371,158 disclose a method for homopolymerization/copolymerization of a to norbornene derivative using a Ti-, Zr-, Hf-, V-, Nb- or Ta-based metallocene complex as a main catalyst and an aluminoxane compound as a cocatalyst. This method has the problem in regard to a low polymerization yield of less than 50% in many cases.

On the other hand, U.S. Pat. No. 5,621,054 discloses a method for copolymerization of norbornene and ethylene without an organoaluminum or aluminoxane compound in the presence of a metallocene catalyst prepared by coordination of a ligand having a unique structure to a metal such as Hf or Zr and a catalyst activator such as N,N-dimethylanilinium tetrakis-perfluorophenylboron. This method also has the difficulty in application to industrial production due to the use of the ligand and the catalyst activator having a very unique structure.

In addition to the aforementioned problems, the conventional techniques have the difficulty in forming a homogeneous catalyst system having a high solubility in a non-polar solvent and preparing a cyclic olefin polymer with a high yield and a high molecular weight.

Compared with a solution polymerization using a homogeneous catalyst system having a high solubility in a non-polar solvent, a solution polymerization using a heterogeneous catalyst system forming a suspended solid due to incomplete dissolution in a non-polar solvent is ready to cause gel formation, so the gel thus produced greatly increases the solution viscosity of the polymer due to the resultant gel and accumulates on the wall of the reactor or the pipe line to inhibit the flow of reactants or products.

Namely, the heterogeneous catalyst system with poor solubility has a difficulty in quantitative control of the catalyst essential to the uniform progress of the reaction and the property control of the product, relative to the homogeneous catalyst system excellent in solubility.

SUMMARY OF THE INVENTION

In an attempt to solve the aforementioned problems with the prior art, the inventors of the present invention have found out that a cyclic olefin polymer having a high molecular weight can be prepared with a high yield in the presence of a catalyst for addition polymerization of a cyclic olefin, which catalyst is prepared from a mixture of a nickel salt compound, an organoaluminoxane compound and a fluorine-containing aromatic hydrocarbon compound, thereby completing the present invention.

It is therefore an object of the present invention to provide a method for preparing a homopolymer or a copolymer of a cyclic olefin compound having a high molecular weight with a high yield in the presence of a homogeneous catalyst system having a high solubility in a non-polar solvent, which method makes it easy to measure the quantitative measurement of the catalyst and suppresses gel formation.

To achieve the object of the present invention, there is provided a method for preparing homo- and co-polymers of cyclic olefin compounds in the presence of a catalyst for addition polymerization. The catalyst is a complex prepared by mixing a nickel salt compound, an organoaluminoxane compound, and a fluorine-containing aromatic hydrocarbon compound represented by the following formula 1 or 2:

$C_6R_mH_{6-m}$   Formula 1 where R is $CF_3$; and m is from 1 to 3, or

$C_6F_nH_{6-n}$   Formula 2 where n is from 1 to 6.

Hereinafter, the present invention will be described in further detail.

The present invention is directed to a novel method for preparing a cyclic olefin polymer using, as a polymerization catalyst, a complex prepared by mixing a nickel salt compound, an organoaluminoxane compound, and at least one fluorine-containing aromatic hydrocarbon compound represented by the formula 1 or 2.

The term "cyclic olefin compound" as used herein refers to, if not specifically limited to, at least one selected from norbornene, or a norbornene derivative represented by the formula 3, which can be used alone or in combination with at least two of them. In the preparation of a copolymer of norbornene and a norbornene derivative (e.g., 5-alkyl-2-norbornene) represented by the formula 3, the mixing weight ratio of norbornene to the norbornene derivative is preferably in the range of 9:1 to 1:1.

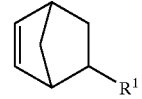

Formula 3 where $R^1$ is an alkyl group containing 1 to 20 carbon atoms.

In the addition polymerization of the cyclic olefin compound, the catalyst as used in the present invention consists of a nickel salt compound, an organoaluminoxane compound, and a fluorine-containing aromatic hydrocarbon compound.

The preferred nickel salt compound is a ligand-containing nickel-carboxylate compound having a high solubility in a non-polar solvent. The specific examples of the nickel salt compound include carboxylates containing at least 6 carbon atoms, such as nickel(hexanoate)$_2$, nickel(heptanoate)$_2$, nickel(octanoate)$_2$, nickel(2-ethylhexanoate)$_2$, nickel(naphthenate)$_2$, nickel(stearate)$_2$, and nickel(versatate)$_2$. The nickel salt compound is preferably used in an amount of $1\times10^{-5}$ to $1\times10^{-3}$ mole per 10 g of the monomer.

The specific examples of the organoaluminoxane compound include methylaluminoxane, ethylaluminoxane, propylaluminoxane, butylaluminoxane, and isobutylaluminoxane. The use of an alkylaluminum compound that is a component of a conventional polymerization catalyst for a diene compound, instead of the organoaluminoxane compound extremely lowers the yield with a disadvantage in the aspect of economy in industrial production and makes it difficult to increase the molecular weight of the polymer to a defined level or above, limiting the improvement of properties.

The specific examples of the fluorine-containing aromatic hydrocarbon compound represented by the formula 1 or 2 include fluorobenzene, difluorobenzene, trifluorobenzene, tetrafluorobenzene, pentafluorobenzene, hexafluorobenzene, α,α,α-trifluorotoluene, 1,2-bis(trifluoromethyl)benzene, 1,3-bis(trifluoromethyl)benzene, 1,4-bis(trifluoromethyl) benzene, 1,2,3-tris(trifluoromethyl)benzene, 1,2,4-tris(trifluoromethyl)benzene, and 1,3,5-tris(trifluoromethyl)benzene.

The mole ratio of the fluorine-containing aromatic hydrocarbon compound represented by the formula 1 or 2 to the nickel salt compound is in the range of 1:1 to 100:1, preferably 3:1 to 30:1. The polymerization yield may be deteriorated when the mole ratio is out of the range, i.e., the fluorine-containing aromatic hydrocarbon compound is used in an amount of less than one mole with respect to one mole of the nickel salt compound. Otherwise, when the fluorine-containing aromatic hydrocarbon compound is used in an amount of more than 100 moles with respect to one mole of the nickel salt compound, there occurs a discoloration of the product with a deterioration of efficiency in the aspect of economy.

The mole ratio of the organoaluminoxane compound to the nickel salt compound is in the range of 25:1 to 200:1, preferably 30:1 to 100:1. The polymerization yield may be deteriorated when the mole ratio is out of the range, i.e., the organoaluminoxane compound is used in an amount of less than 25 moles with respect to one mole of the nickel salt compound. Otherwise, when the organoaluminoxane compound is used in an amount of more than 200 moles with respect to one mole of the nickel salt compound, there occurs a discoloration of the product with a deterioration of efficiency in the aspect of economy.

The aforementioned compounds, i.e., the nickel salt compound, the organoaluminoxane compound, and the fluorine-containing aromatic hydrocarbon compound are mixed together to prepare an addition polymerization catalyst for the preparation of a cyclic olefin polymer. The solvent for dilution of the catalyst as used herein must be a non-polar solvent not reactive with the catalyst. The preferred examples of the non-polar solvent include cyclohexane, hexane, benzene, toluene, and o-dichlorobenzene.

The addition sequence of the respective constituent components of the catalyst is a solution of the nickel salt compound that is added to a reactor in the nitrogen atmosphere, the organoaluminoxane compound, and then the fluorine-containing aromatic hydrocarbon compound represented by the formula 1 or 2. This addition sequence can be changed under circumstances.

The catalyst thus prepared is used for addition polymerization of a cyclic olefin to prepare the cyclic olefin polymer of the present invention. The specific examples of the non-polar solvent used for polymerization may include aliphatic hydrocarbons such as isopentane, hexane, heptane, octane, and isooctane; cycloaliphatic hydrocarbons such as cyclopentane, methylcyclopentane, cyclohexane, methylcyclohexane, and ethylcyclohexane; and aromatic hydrocarbons such as benzene, toluene, chlorobenzene, and o-dichlorobenzene. The weight ratio of the polymerization solvent to the monomer is preferably in the range of 4:1 to 20:1.

The polymerization solvent, which has a significant effect on the polymerization reaction, should be used under the condition free from oxygen and water. The polymerization reaction is initiated in the high-purity nitrogen atmosphere, and the polymerization temperature is preferably in the range from 0° C. to 100° C.

The polymerization reaction is carried out for 1 to 3 hours under a proper catalytic condition to produce a cyclic olefin polymer with a yield of 70 to 100%. The reaction product after the polymerization reaction is precipitated with methanol or ethanol.

The use of the catalyst for cyclic olefin polymerization according to the present invention can provide cyclic olefin polymers having high molecular weights with high yields.

DETAILED DESCRIPTION OF THE INVENTION

Now, the present invention will be described in further detail by way of the following Examples, which are not intended to limit the scope of the present invention.

EXAMPLE 1

The addition catalyst used for the reaction was prepared by mixing nickel(2-ethylhexanoate)$_2$ (1% cyclohexane solution), methylaluminoxane (6.7% toluene solution) and α,α,α-trifluorotoluene (1% cyclohexane solution). Here, the used amount of the nickel(2-ethylhexanoate)$_2$ was $1.0 \times 10^{-4}$ mole per 10 g of the monomer. For the polymerization reaction, a sufficient amount of nitrogen was blown into a pressure reactor, and chlorobenzene as a polymerization solvent and norbornene as the monomer were added to the pressure reactor. Nickel(2-ethylhexanoate)$_2$, methylaluminoxane and α,α,α-trifluorotoluene were sequentially added to the reactor (the molar ratio was 1:25:10, respectively). The inner temperature of the reactor was adjusted to 40° C. for one-hour reaction. Here, the weight ratio of the polymerization solvent to the monomer was 8.7:1. After the completion of the reaction, ethanol was added to the product to complete the reaction.

EXAMPLES 2 to 18

The procedures were performed to prepare a polynorbornene in the same manner as described in Example 1, excepting that the polymerization conditions such as the catalyst composition, the fluorine-containing aromatic hydrocarbon compound, and the polymerization solvent were changed as presented in Table 1.

TABLE 1

| Div. | Polymerization Catalyst[1] | Mole Ratio | Weight Ratio of Polymerization Solvent to Monomer | Polymerization Solvent[2] |
|---|---|---|---|---|
| Example 1 | Nickel(2-EHA)$_2$/MAO/TFT | 1:25:10 | 4.3:1 | Cl—Bz |
| Example 2 | Nickel(2-EHA)$_2$/MAO/TTB | 1:32:1 | 8.7:1 | Cl—Bz |

TABLE 1-continued

| Div. | Polymerization Catalyst[1] | Mole Ratio | Weight Ratio of Polymerization Solvent to Monomer | Polymerization Solvent[2] |
|---|---|---|---|---|
| Example 3 | Nickel(2-EHA)$_2$/TTB/MAO | 1:3:32 | 8.7:1 | Cl—Bz |
| Example 4 | Nickel(2-EHA)$_2$/TTB/MAO | 1:5:32 | 8.7:1 | Cl—Bz |
| Example 5 | Nickel(2-EHA)$_2$/TTB/MAO | 1:10:32 | 8.7:1 | Cl—Bz |
| Example 6 | Nickel(2-EHA)$_2$/MAO/TTB | 1:32:10 | 8.7:1 | Cl—Bz |
| Example 7 | Nickel(2-EHA)$_2$/TTB/MAO | 1:15:32 | 8.7:1 | Cl—Bz |
| Example 8 | Nickel(2-EHA)$_2$/TTB/MAO | 1:20:32 | 8.7:1 | Cl—Bz |
| Example 9 | Nickel(2-EHA)$_2$/TTB/MAO | 1:50:32 | 8.7:1 | Cl—Bz |
| Example 10 | Nickel(2-EHA)$_2$/MAO/BTB | 1:32:20 | 8.7:1 | Cl—Bz |
| Example 11 | Nickel(2-EHA)$_2$/MAO/TFT | 1:32:20 | 8.7:1 | Cl—Bz |
| Example 12 | Nickel(2-EHA)$_2$/MAO/FLB | 1:32:20 | 8.7:1 | Cl—Bz |
| Example 13 | Nickel(2-EHA)$_2$/MAO/DFB | 1:32:20 | 8.7:1 | Cl—Bz |
| Example 14 | Nickel(2-EHA)$_2$/DFB/MAO | 1:20:32 | 8.7:1 | Cl—Bz |
| Example 15 | Nickel(2-EHA)$_2$/MAO/PFB | 1:32:20 | 8.7:1 | Cl—Bz |
| Example 16 | Nickel(2-EHA)$_2$/MAO/FLB | 1:32:100 | 8.7:1 | Cl—Bz |
| Example 17 | Nickel(2-EHA)$_2$/TFT/MAO | 1:20:100 | 4.3:1 | Toluene |
| Example 18 | Nickel(2-EHA)$_2$/TFT/MAO | 1:20:100 | 4.3:1 | Cyclohexane |

Note:
[1] The addition sequence of the respective constituent components of the catalyst: Nickel(2-EHA)$_2$ = Nickel(2-ethylhexanoate)$_2$; MAO = methylaluminoxane; TFT = α,α,α-trifluorotoluene; TTB = 1,3,5-tris(trifluoromethyl)benzene; BTB = 1,4-bis(trifluoromethyl)benzene; FLB = fluorobenzene; DFB = difluorobenzene; PFB = pentafluorobenzene; Polymerization temperature = 40° C.; Polymerization time = 1 hour
[2] Cl—Bz = chlorobenzene EXAMPLES 19 to 26

The procedures were performed to perform a polymerization reaction in the same manner as described in Example 1, excepting that norbornene and a norbornene derivative were used as a cyclic olefin compound for copolymerization to prepare a polynorbornene copolymer under the polymerization conditions as presented in Table 2.

TABLE 2

| Div. | Polymerization Catalyst[1] | Mole Ratio | Norbornene Derivative[2] | Weight Ratio of Nb[3] to Nb Derivative |
|---|---|---|---|---|
| Example 19 | Nickel(2-EHA)$_2$/MAO/TTB | 1:55:20 | Octyl-Nb | 9:1 |
| Example 20 | Nickel(2-EHA)$_2$/MAO/TTB | 1:55:20 | Octyl-Nb | 4:1 |
| Example 21 | Nickel(2-EHA)$_2$/MAO/FLB | 1:55:20 | Octyl-Nb | 9:1 |
| Example 22 | Nickel(2-EHA)$_2$/MAO/FLB | 1:55:20 | Octyl-Nb | 4:1 |
| Example 23 | Nickel(2-EHA)$_2$/MAO/TFT | 1:40:41 | Octyl-Nb | 1:1 |
| Example 24 | Nickel(2-EHA)$_2$/MAO/FLB | 1:55:20 | Hexyl-Nb | 9:1 |
| Example 25 | Nickel(2-EHA)$_2$/MAO/FLB | 1:55:50 | Hexyl-Nb | 4:1 |
| Example 26 | Nickel(2-EHA)$_2$/MAO/TTB | 1:55:50 | Hexyl-Nb | 1:1 |

Note:
[1] The addition sequence of the respective constituent components of the catalyst: Nickel(2-EHA)$_2$ = Nickel(2-ethylhexanoate)$_2$; MAO = methylaluminoxane; TTB = 1,3,5-tris(trifluoromethyl)benzene; FLB = fluorobenzene; TFT = α,α,α-trifluorotoluene; Weight ratio of polymerization solvent to monomer = 8.7:1 Polymerization solvent: chlorobenzene (Examples 19 to 22, 24, 25 and 26) o-dichlorobenzene (Example 23)Polymerization temperature = 40° C.; Polymerization time = 1 hour
[2] Octyl-Nb = 5-Octyl-2-norbornene; Hexyl-Nb = 5-Hexyl-2-norbornene
[3] Nb = Norbornene

COMPARATIVE EXAMPLES 1 TO 8

The procedures were performed to prepare a polymer in the same manner as described in Example 1, excepting that (1) the fluorine-containing aromatic hydrocarbon compound represented by the formula 1 or 2 was not used; or that (2) another metal salt compound was used as a main catalyst; or that (3) another compound rather than the fluorine-containing aromatic hydrocarbon compound represented by the formula 1 or 2 was used as a catalyst activator; or that (4) another aluminum compound was used instead of MAO, under the polymerization conditions as presented in Table 3.

TABLE 3

| Div. | Polymerization Catalyst[1] | Mole Ratio | Weight Ratio of Polymerization Solvent to Monomer | Polymerization Solvent[2] | Polym. Time (hr) |
|---|---|---|---|---|---|
| Comparative Example 1 | Nickel(2-EHA)$_2$/MAO | 1:40 | 8.7:1 | Cl—Bz | 1 |
| Comparative Example 2 | Co(naph)$_2$/MAO | 1:200 | 4.3:1 | Toluene | 3 |
| Comparative Example 3 | Co(naph)$_2$/MAO | 1:200 | 4.3:1 | Cyclohexane | 3 |
| Comparative Example 4 | Nickel(2-EHA)$_2$/MAO/BF$_3$H$_3$PO$_4$ | 1:25:10 | 4.3:1 | Cl—Bz | 2 |
| Comparative Example 5 | Nickel(2-EHA)$_2$/MAO/BF$_3$S(CH$_3$)$_2$ | 1:25:10 | 4.3:1 | Cl—Bz | 2 |
| Comparative Example 6 | Nickel(2-EHA)$_2$/MAO/Epi-Cl | 1:25:10 | 4.3:1 | Cl—Bz | 2 |
| Comparative Example 7 | Nickel(2-EHA)$_2$/AlEt$_3$/BEt$_3$ | 1:100:10 | 4.3:1 | Toluene | 3 |
| Comparative Example 8 | Nickel(2-EHA)$_2$/AlEt$_3$/BEt$_3$ | 1:50:10 | 4.3:1 | Toluene | 3 |

Note:
[1] The addition sequence of the respective constituent components of the catalyst: Nickel(2-EHA)$_2$ = Nickel(2-ethylhexanoate)$_2$; MAO = methylaluminoxane; Co(naph)$_2$ = Co(naphthenate)$_2$; Epi-Cl = Epichlorohydrin; AlEt$_3$ = Triethylaluminum; BEt$_3$ = Triethylborane; Polymerization temperature = 40° C.;
[2] Cl—Bz = chlorobenzene

COMPARATIVE EXAMPLES 9 to 13

The procedures were performed to prepare a copolymer in the same manner as described in Example 19, excepting that (1) the fluorine-containing aromatic hydrocarbon compound represented by the formula 1 or 2 was not used; or that (2) another aluminum compound was used instead of MAO, under the polymerization conditions as presented in Table 4.

TABLE 4

| Div. | Polymerization Catalyst[1] | Mole Ratio | Norbornene Derivative[2] | Weight Ratio of Nb[3] to Nb Derivative | Polymerization Solvent[4] |
|---|---|---|---|---|---|
| Comparative Example 9 | Nickel(2-EHA)$_2$/MAO | 1:55 | Octyl-Nb | 1:1 | Cl—Bz |
| Comparative Example 10 | Nickel(2-EHA)$_2$/MAO | 1:100 | Octyl-Nb | 1:1 | Toluene |
| Comparative Example 11 | Nickel(2-EHA)$_2$/AlEt$_3$/BEt$_3$ | 1:200:10 | Octyl-Nb | 1:1 | o-Cl—Bz |
| Comparative Example 12 | Nickel(2-EHA)$_2$/AlEt$_3$/BEt$_3$ | 1:100:10 | Hexyl-Nb | 1:1 | o-Cl—Bz |
| Comparative Example 13 | Nickel(2-EHA)$_2$/AlEt$_3$/BEt$_3$ | 1:200:10 | Hexyl-Nb | 1:1 | o-Cl—Bz |

Note:
[1] The addition sequence of the respective constituent components of the catalyst: Nickel(2-EHA)$_2$ = Nickel(2-ethylhexanoate)$_2$; MAO = methylaluminoxane; AlEt$_3$ = Triethylaluminum; BEt$_3$ = Triethylborane; Polymerization time: Comparative Example 9 = 1 hour; Comparative Example 10 = 2 hours; Comparative Examples 11, 12 and 13 = 3 hours; Weight ratio of polymerization solvent to monomer = 8.7:1;Polymerization time = 40° C.;
[2] Octyl-Nb = 5-Octyl-2-norbornene; Hexyl-Nb = 5-Hexyl-2-norbornene
[3] Nb = Norbornene
[4] Cl—Bz = chlorobenzene; o-Cl—Bz = o-diclorobenzene

EXPERIMENTAL EXAMPLE 1

The polymers prepared in Examples 1 to 26 and Comparative Examples 1 to 13 were analyzed in regard to yield and molecular weight. The results are presented in Table 5.

TABLE 5

| Div | Yield (%) | $M_w$[1] | MWD[2] |
|---|---|---|---|
| Example 1 | 81.3 | 690,000 | 2.28 |
| Example 2 | 77.2 | 833,000 | 2.25 |
| Example 3 | 81.6 | 1,288,000 | 2.05 |

TABLE 5-continued

| Div | Yield (%) | $M_w{}^{1)}$ | MWD$^{2)}$ |
|---|---|---|---|
| Example 4 | 85.9 | 1,158,000 | 2.24 |
| Example 5 | 89.0 | 1,074,000 | 2.50 |
| Example 6 | 85.3 | 1,069,000 | 2.75 |
| Example 7 | 88.1 | 1,168,000 | 2.10 |
| Example 8 | 90.4 | 1,069,000 | 2.75 |
| Example 9 | 83.2 | 1,210,000 | 2.19 |
| Example 10 | 88.5 | 1,050,000 | 2.23 |
| Example 11 | 81.6 | 970,000 | 2.41 |
| Example 12 | 93.5 | 1,125,000 | 2.34 |
| Example 13 | 93.0 | 928,000 | 2.65 |
| Example 14 | 83.8 | 999,000 | 2.19 |
| Example 15 | 79.4 | 979,000 | 2.27 |
| Example 16 | 81.9 | 968,000 | 2.84 |
| Example 17 | 88.0 | 322,000 | 2.38 |
| Example 18 | 98.8 | 389,000 | 2.48 |
| Example 19 | 95.0 | 609,000 | 2.96 |
| Example 20 | 89.6 | 649,000 | 3.13 |
| Example 21 | 93.5 | 659,000 | 3.13 |
| Example 22 | 86.0 | 595,000 | 2.58 |
| Example 23 | 73.8 | 289,000 | 2.02 |
| Example 24 | 95.8 | 672,000 | 3.16 |
| Example 25 | 90.8 | 574,000 | 2.49 |
| Example 26 | 72.1 | 621,000 | 2.17 |
| Comparative Example 1 | 60.0 | 682,000 | 2.19 |
| Comparative Example 2 | 0.5 | — | — |
| Comparative Example 3 | 0 | — | — |
| Comparative Example 4 | 23.0 | 326,000 | 2.03 |
| Comparative Example 5 | 38.1 | 696,000 | 2.43 |
| Comparative Example 6 | 26.3 | 607,000 | 2.06 |
| Comparative Example 7 | 1.6 | 19,000 | 1.36 |
| Comparative Example 8 | 4.9 | 76,000 | 2.39 |
| Comparative Example 9 | 51.0 | 432,000 | 2.29 |
| Comparative Example 10 | 16.5 | 96,000 | 1.72 |
| Comparative Example 11 | 14.0 | * | * |
| Comparative Example 12 | 4.3 | * | * |
| Comparative Example 13 | 13.3 | * | * |

*Insoluble in the solvent for GPC, 1,2,4-trichlorobenzene, so no measurement was achieved.
$^{1)}M_w$: Weight average molecular weight,
$^{2)}$MWD: Molecular weight distribution As described above in detail, the present invention can prepare cyclic olefin homo- and co-polymers having high molecular weights with high yields in the presence of a non-polar solvent and a complex having a high solubility as a catalyst that is prepared by mixing a nickel salt compound, an organoaluminoxane compound and at least one fluorine-containing aromatic hydrocarbon compound represented by the formula 1 or 2.

What is claimed is:

1. A method for preparing homo- and co-polymers by polymerization of cyclic olefin compounds in the presence of a non-polar solvent and a catalyst,
the catalyst being a complex prepared by mixing a nickel salt compound, an organoaluminoxane compound, and at least one fluorine-containing aromatic hydrocarbon compound represented by the following formula 1 or 2:

$$C_6R_mH_{6-m} \quad \text{Formula 1}$$

wherein R is $CF_3$; and m is from 1 to 3, or $$C_6F_nH_{6-n} \quad \text{Formula 2}$$

wherein n is from 1 to 6.

2. The method as claimed in claim 1, wherein the fluorine-containing aromatic hydrocarbon compound represented by the formula 1 or 2 is used in an amount of 1 to 100 moles per one mole of the nickel salt compound.

3. The method as claimed in claim 1, wherein the fluorine-containing aromatic hydrocarbon compound represented by the formula 1 or 2 is used in an amount of 3 to 30 moles per one mole of the nickel salt compound.

4. The method as claimed in claim 1, wherein the fluorine-containing aromatic hydrocarbon compound represented by the formula 1 or 2 includes at least one selected from the group consisting of fluorobenzene, difluorobenzene, trifluorobenzene, tetrafluorobenzene, pentafluorobenzene, hexafluorobenzene, α,α,α-trifluorotoluene, 1,2-bis(trifluoromethyl)benzene, 1,3-bis(trifluoromethyl)benzene, 1,4-bis(trifluoromethyl)benzene, 1,2,3-tris(trifluoromethyl)benzene, 1,2,4-tris(trifluoromethyl)benzene, and 1,3,5-tris(trifluoromethyl)benzene.

5. The method as claimed in claim 1, wherein the nickel salt compound includes at least one selected from the group consisting of nickel(hexanoate)$_2$, nickel(heptanoate)$_2$, nickel(octanoate)$_2$, nickel(2-ethylhexanoate)$_2$, nickel(naphthenate)$_2$, nickel(stearate)$_2$, and nickel(versatate)$_2$.

6. The method as claimed in claim 1, wherein the nickel salt compound is used in an amount of $1.0 \times 10^{-5}$ to $1.0 \times 10^{-3}$ mole per 10 g of the cyclic olefin compound.

7. The method as claimed in claim 1, wherein the organoaluminoxane compound includes at least one selected from the group consisting of methylaluminoxane, ethylaluminoxane, propylaluminoxane, butylaluminoxane, and isobutylaluminoxane.

8. The method as claimed in claim 1, wherein the organoaluminoxane compound is used in an amount of 25 to 200 moles per one mole of the nickel salt compound.

9. The method as claimed in claim 1, wherein the organoaluminoxane compound is used in an amount of 30 to 100 moles per one mole of the nickel salt compound.

10. The method as claimed in claim 1, wherein the cyclic olefin compound includes at least one selected from the group consisting of norbornene and a norbornene derivative represented by the following formula 3:

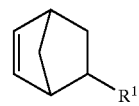

Formula 3 wherein $R^1$ is an alkyl group containing 1 to 20 carbon atoms.

11. The method as claimed in claim 1, wherein the non-polar solvent includes at least one aliphatic hydrocarbon selected from the group consisting of isopentane, hexane, heptane, octane, and isooctane; at least one cycloaliphatic hydrocarbon selected from the group consisting of cyclopentane, methylcyclopentane, cyclohexane, methylcyclohexane, and ethylcyclohexane; and at least one aromatic hydrocarbon selected from the group consisting of benzene, toluene, chlorobenzene, and o-dichlorobenzene.

* * * * *